United States Patent [19]

Brandenburg et al.

[11] Patent Number: 5,275,874
[45] Date of Patent: Jan. 4, 1994

[54] GLASS FIBER INSULATION BONDED WITH A UV CURED SYSTEM

[75] Inventors: Kathryn L. Brandenburg, Granville; Carl R. Strauss, Newark, both of Ohio

[73] Assignee: Owens-Corning Fiberglas Technology Inc., Summit, Ill.

[21] Appl. No.: 812,142

[22] Filed: Dec. 23, 1991

[51] Int. Cl.⁵ .............................................. D04H 1/58
[52] U.S. Cl. .................... 428/288; 156/73.1; 156/275.5; 428/290; 428/920
[58] Field of Search ............ 428/288, 290, 920; 156/73.1, 275.5, 273.5

[56] References Cited

U.S. PATENT DOCUMENTS

| | | | |
|---|---|---|---|
| 4,012,553 | 3/1977 | Clemens | 156/275.5 |
| 4,681,800 | 7/1987 | Zerfass et al. | 156/275.5 |
| 5,169,571 | 12/1992 | Buckley | 264/257 |
| 5,217,654 | 6/1993 | Buckley | 264/279 |

Primary Examiner—James J. Bell
Attorney, Agent, or Firm—Ted C. Gillespie; Patrick P. Pacella

[57] ABSTRACT

Glass fiber insulation bonded with a UV cured system is disclosed. Specific wavelengths of UV radiation were found that penetrate through the wool pack and yield a uniformly cured polymer throughout the thickness of insulation.

6 Claims, 1 Drawing Sheet

GLASS FIBER INSULATION BONDED WITH A UV CURED SYSTEM

TECHNICAL FIELD

This invention relates to glass fibers bound together with an ultraviolet light cured binder in an insulation batt. Conventional binders for wool insulation are thermally cured thermoset resins, typically phenol-formaldehyde resins.

BACKGROUND ART

Phenol-formaldehyde binder is the glue that holds glass fibers together in wool insulation. Phenolic binders have been holding glass wool together since the late 1930's.

In a fiber-forming operation the usual practice is to spray apply an uncured binder, such as a phenol-formaldehyde condensate in solution form, to newly attenuated fibers so that the fibers are wetted with the uncured binder. Fibers of this character are collected in a mass upon a moving conveyor. The thickness of the mass is controlled to provide a fibrous batt which is conveyed or passed through an oven or curing zone for curing the binder in the batt.

Curing usually is accomplished in an oven heated to a temperature of 400° F. The curing operation compresses the glass fibers and binder to a desired thickness and heats them for 30 seconds. Because the operation forces hot air through a product designed to be a thermal insulator, the amount of heat in the insulation varies and therefore the degree of cure of the thermoset resin is variable.

DISCLOSURE OF THE INVENTION

Our invention is the use of a binder that cures with light rather than heat. In particular, the binder cures when hit with the light waves in the long wavelength ultra violet (UV) range. Although UV curing has been used in continuous strand reinforcements to cure the size on individual filaments, no one believed it could be used to cure binder on wool. It was thought that the thickness of the wool product (6–18") would filter out the UV light, so that only the surface areas of the wool product would be cured. We have discovered a specific region of UV light that can easily penetrate the wool pack due to the scattering effect of the UV light within the wool pack.

We have discovered specific wavelengths of ultraviolet radiation that penetrate through the wool pack. Typically, glass absorbs UV light in the high energy region, i.e., wavelengths of about 250 nm. Standard window glass that is 1 mm thick absorbs UV light that is less than 307 nm. We have found that our invention works well with wavelengths ranging from low energy ultraviolet light to visible light. Preferably, the wave length ranges from 310 nm to 700 nm. More preferably, it ranges from 310 nm to 450 nm. We apply an ultraviolet curable oligomer to the fiberglass and then form an insulation pack. The pack then travels under ultraviolet lights instead of through a thermal oven to be cured. After being exposed to ultraviolet light for a short period of time, the wool is packaged by conventional means.

DESCRIPTION OF THE PREFERRED EMBODIMENTS

Figure 1:
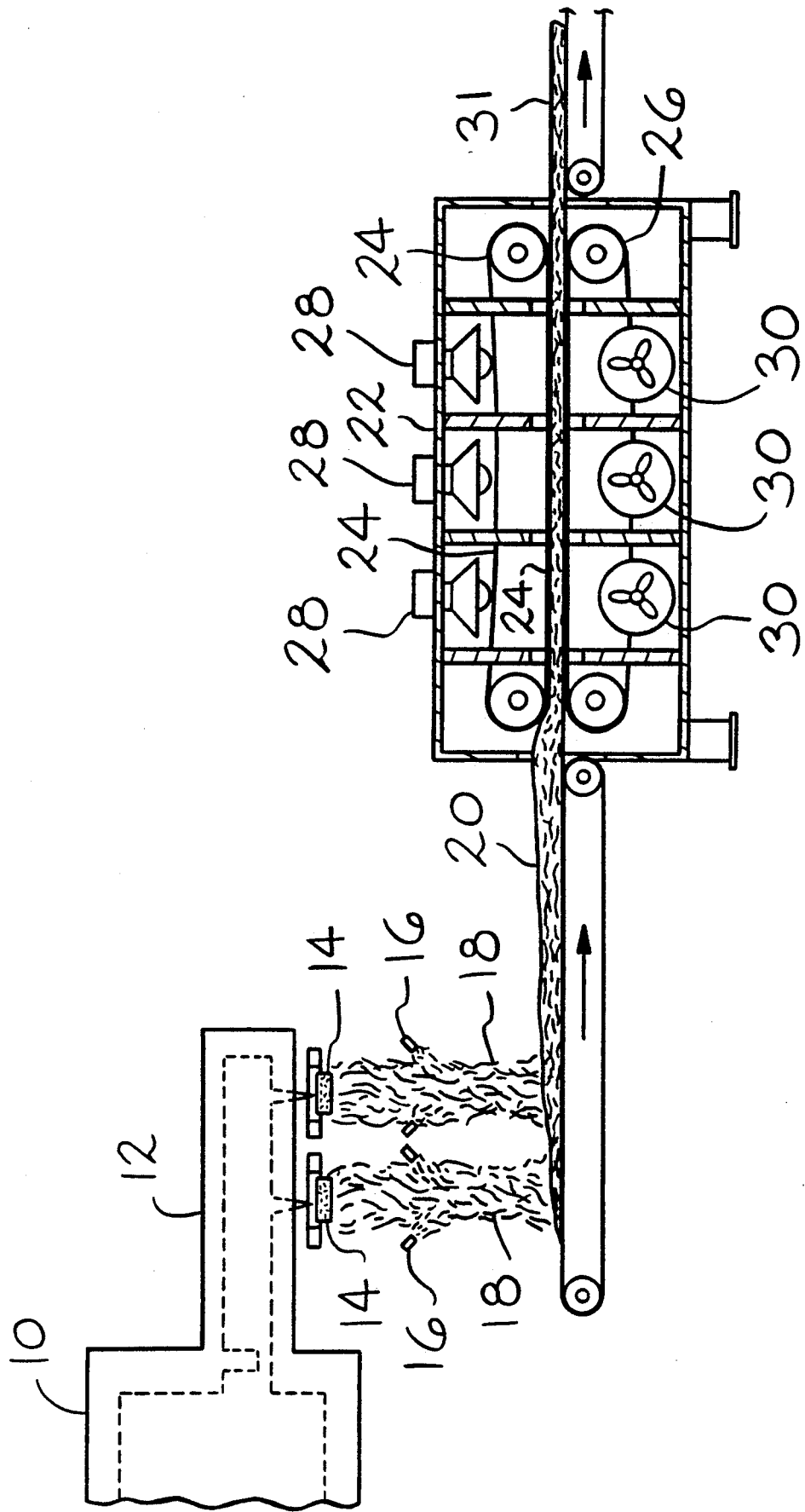
FIG. 1 is a schematic cross-sectional view of an apparatus for curing fibrous insulation material using UV light.

The UV curable binders we employ can vary widely. We can use reactive-type coating compositions such as oligomers, or polymers which contain polymerizable functional groups With reactive unsaturation, e.g., acrylate, methacrylate, vinyl, vinyl ether, allylic, or maleate groups, that can react to chain-extend and/or crosslink. The binder may be a mixture of these compositions and contains a photoinitiator to enable the UV curing. More specifically we use UV curable coatings which contain reactive oligomers, e.g., acrylated epoxies, acrylated urethanes, acrylated polyesters, acrylated silicones, multifunctional acrylate and methacrylate monomers, and monofunctional monomers, unsaturated polyesters and acrylics.

A typical ultraviolet curable formulation consists of the following elements which impart the stated attributes:

resin/oligomer—basic coating properties
monofunctional monomer (s)—viscosity reduction important for spray application; chemically bound in final product
multifunctional monomer—viscosity reduction, controls crosslink density of the network to yield necessary physical properties
additives—adhesion promoter, dust reduction, etc.
photoinitiator—converts the energy from light into either free radicals or cations which start the polymerization The photopolymerization reaction converts the liquid oligomer/monomer material into the cured product after exposure to light. The two types of polymerization used in light radiation curing are free radical and cationic.

Two UV curable binders we are evaluating are a methacrylate-based ultraviolet binder, Dymax Light Weld 186 and a maleate based binder from DSM Desotech Inc.

This invention will be described with reference to the apparatus for curing binder applied to fibrous glass insulation material, although it is to be understood that the invention can be practiced for curing binder applied to other heat softenable mineral materials, such as rock, slag and basalt.

Referring to the FIG. 1, furnace 10 supplies molten glass via forehearth 12 to fiberizers 14. Veils of fibers 18 produced by the fiberizers are sprayed by binder applicators 16, and the fibers are collected as uncured wool pack 20.

It is to be understood that the pack can be produced by alternate methods, many of which are known in the art. The uncured pack is then passed through chamber 22 between top conveyor 24 and bottom conveyor 26. Chamber 22 is preferably multi-zoned and fitted with any number of UV lamps 28. UV lamps 28 direct radiation against the upper side of the uncured wool pack. We do this out of convenience and not necessity as lamps 28 may be positioned on the sides or bottom of the wool pack.

Cooling means such as blowers 30 also may be used. While cooling means are not absolutely necessary, one must remember that the fibers in the region of binder application are still at a temperature of 500° to 600° F. We feel it's desirable to cool the wool pack before further processing after UV curing. Cooling plates with or without a heat exchange fluid (not shown) may be used in place of blower 30. The cured insulation exits chamber 22 as cured and dried insulation 31.

EXAMPLE

We conducted an actual plant trial. The phenolic binder applicator in place was turned off and a second binder ring was hung below the normal binder ring. A pressure pot containing a methacrylate-based ultraviolet binder, Dymax Light Weld 186, was attached to the ring via hoses. Approximately 12 feet of full width uncured glass fiber material was collected on the ramp on a large piece of cardboard. The actual sample was 12 feet long, 12 inches thick and 5 feet wide. The glass composition of the wool was normal product wool insulation such as those described in U.S. Pat. Nos. 2,877,124 and 2,882,173.

A Dymax PC-2 ultraviolet (365 nm) lamp was used to cure the binder. When the wool is photolyzed, it glows from all sides, top to bottom. The light does not appear to have any problems penetrating the pack. The intensity of the light coming through the bottom and out of the sides of the insulation was measured using a UVX radiometer with 365 nm sensor. The light penetrating through the bottom was 1% of the incoming intensity and that from the sides was 2-7% of the incoming intensity. The physical properties of this cured trial wool are:
  tensile strength is acceptable for handleability
  compression at a 14:1 ratio for 5 min., with a 15 min. relaxation yields 65% deadpin recovery.
  stiffness on a 4 ft. segment is about 45 degrees
  the wool batts are very soft feeling and non-irritating One sample was cured under the UV lamp with a round weight sitting on top of it. It left an imprint on the top of the batt. After approximately 2 weeks the imprint was still there. This indicates that the wool can be cured to a specific shape and that the scattering of the UV light is efficient enough to allow curing under an opaque object.

Ultraviolet radiation curing of insulation allows faster penetration of the pack as compared with thermal radiation. Curing medium penetration by ultraviolet light into the product causes fast, uniform curing, potentially allowing increased production. There is also no compaction of the wool from trying to blow hot air through the pack. The other positive aspects of using ultraviolet radiation to cure the binder are: 1) there are no ovens required and so there will be reduced energy consumption and reduced emissions; 2) cure can be initiated at a specified time when exposed to UV light so that on-off curing is possible, without precure; and 3) the material is normally available as 100% so no drying is required.

We claim:

1. Glass fiber insulation having an insulating thickness comprising glass fibers bonded together with a UV cured binder, wherein the insulation is uniformly cured throughout it's thickness with the UV binder.

2. Glass fiber insulation according to claim 1 wherein the UV curable binder comprises at least one oligomer.

3. Glass fiber insulation according to claim 2 wherein the oligomer has reactive unsaturated functional groups.

4. Glass fiber insulation according to claim 1 wherein the UV cured binder is methacrylate-based.

5. Glass fiber insulation according to claim 1 wherein the UV curable binder includes at least one photoinitiator.

6. Glass fiber insulation according to claim 1 wherein the UV curable binder is maleate based.

* * * * *